Dec. 14, 1948.  S. J. DUHAIME ET AL  2,456,115
CLOTHESLINE REEL
Filed Oct. 10, 1946
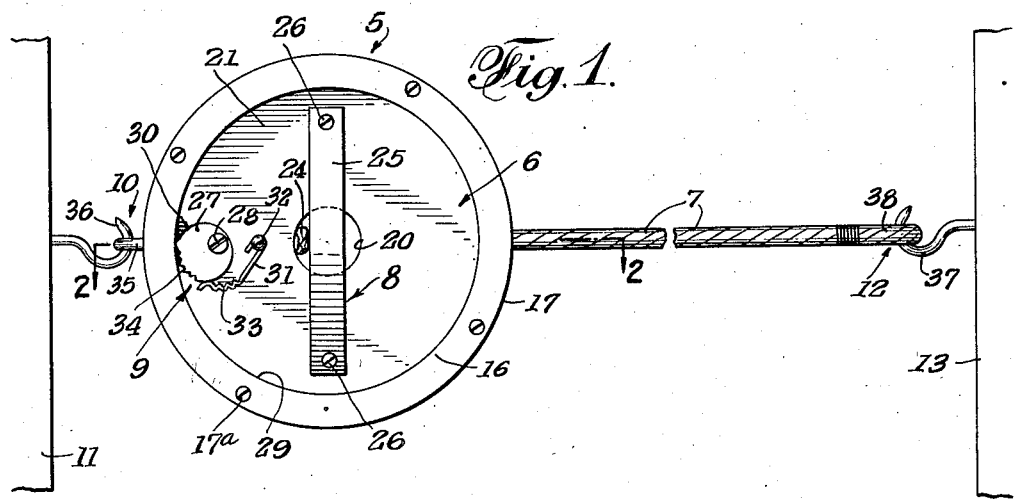
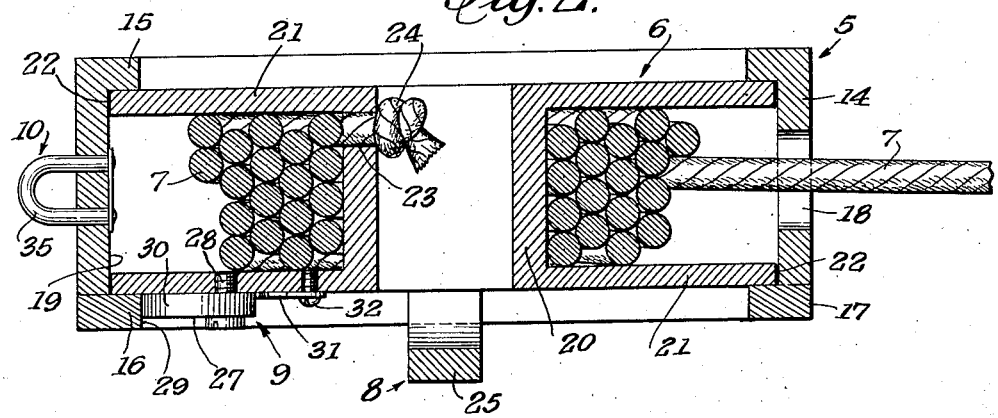
INVENTORS.
S. J. Duhaime & C. V. Butler
BY C. G. Stratton
ATTORNEY Patented Dec. 14, 1948

2,456,115

UNITED STATES PATENT OFFICE 2,456,115

CLOTHESLINE REEL

Sidney J. Duhaime and Cornelius V. Butler,
Los Angeles, Calif.

Application October 10, 1946, Serial No. 702,558

6 Claims. (Cl. 242—101)

This invention relates to a clothesline reel and has for its primary object to provide a reel for storing a length of clothesline in wound up condition preparatory to being unwound and stretched between connecting points for use.

Another object of the invention is to provide a reel for a clothesline embodying means for locking the same after unwinding of a desired length of line to hold said line taut in use.

Another object of the invention is to provide storing means for a clothesline to obviate its exposure to dirt and the like when not in use and whereby said line can be extended for use to a desired length.

Our invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawings merely show and the following description merely describes one embodiment of the present invention, which is given by way of illustration or example only.

In the drawings, like reference characters designate similar parts in the several views.

Fig. 1 is a side elevational view of a clothesline reel embodying the present invention and shown in use.

Fig. 2 is an enlarged cross-sectional view as taken on the line 2—2 of Fig. 1.

The clothesline reel which is illustrated comprises a housing 5, a reel or spool 6 in said housing for holding a length of clothesline 7 in wound up condition, a handle 8 on the spool for turning the same in the housing, releasable locking means 9 for locking the spool and reel against relative rotation, means 10 for mounting the device on a pole or other support 11, and means 12 on the outer end of the clothesline for effecting connection to a pole or other support 13 spaced from the pole 11.

As shown, the housing 5 is formed as a tubular member 14 having a fixed integral annular flange 15 at one end thereof. A similar removable flange 16, at the other end of the tubular member, is formed by a ring 17 held in place as by screws 17a. A suitable opening 18 is provided in the member 14 for passage therethrough of the line 7. In this manner, the housing is provided with an annular raceway 19 for the spool 6, said raceway comprising the inner annular surface of the member 14. Endwise movement of said spool is limited by the flanges 15 and 16.

The spool 6 comprises a tubular core 20 and circular disc flanges 21 on either side of said core. The outer circular edges 22 of said flanges have bearing in the raceway 19 so that the spool is readily rotatable with respect to the housing 5. An opening 23 is provided in the core 20 for the knotted inner end 24 of the line 7 which is wound around said core between the spool flanges 21.

The handle 8 may vary in design. As shown it comprises a diametrically arranged hand grip 25 secured by screws 26 to the outer face of one of the spool flanges 21. A revolvable handle, at an outer point of one of the flanges 21, may be substituted for the handle shown.

The locking means 9 is provided to permit free rotation of the spool in one direction but to lock the same to the housing upon attempted rotation in the other direction. However, the locking means is releasable so that two-directional rotation can be had. The means 9 is shown as comprising a disc 27 eccentrically mounted on a pivot stud 28 on one of the flanges 21. The disc is so related to the inner annular face 29 of either flange 15 or 16 that its peripheral face 30 is adapted to wedge against said face 29 during attempted rotation of the spool 6 in a direction to pay out the line 7. However, the disc 27 can be moved to retracted position on its pivot and held retracted by a resilient member 31 fixed, by a screw 32, to the flange 21 which mounts said disc. To this end the member 31 is formed with a series of kinks 33 which are associated with serrations 34 in the face 30 of disc 27 to engage said serrations and thereby hold the disc in non-wedging position.

The means 10, also, may be varied. As shown, said means merely comprises an eye 35 on the housing approximately diametrically opposite to the opening 18 therein. By engaging the eye 35 with a hook 36 on the pole 11, the reel can be suspended from said pole. A similar hook 37 on the pole 13 is provided for connection with an eye or thimble 38, the latter comprising the means 12.

In practice the reel is hung on the hook 36 with the clothesline wound up on the reel 6. When it is desired to stretch the clothesline from the reel to the hook 37, the disc 27 is rotated out of engagement with the face 29 and held by the member 31. The eye 38 of the line is then grasped and pulled. The spool unwinds freely to permit engaging said eye on the hook 37. The disc 27 is then released from the member 31 so that the free end of the latter presses said disc into engagement with the surface 29. Now, by turning the handle 25 in a direction to wind up the clothesline, the same is effectively tautened and maintained so by the wedging action between the faces 29 and 30. By again releasing the disc 27 and unhooking the eye 38, the handle 25 can be turned to wind up the line on the spool. If desired the reel can be removed and placed in a place protected from the elements.

While we have illustrated and described what we now regard as the preferred embodiment of our invention, the construction is, of course, subject to modifications without departing from the spirit and scope of our invention. We, therefore, do not wish to restrict ourselves to the particular form of construction illustrated and described, but desire to avail ourselves of all modifications that may fall within the scope of the appended claims.

Having thus described our invention, what we claim and desire to secure by Letters Patent is:

1. A clothesline reel comprising a tubular housing formed with end retaining flanges and having an opening, a spool in said housing having end disc flanges engaged with said end retaining flanges, said end disc flanges having rotational engagement with the inner surface of said tubular housing, and a clothesline wound on said spool and passing through the mentioned opening.

2. A clothesline reel comprising a tubular housing formed with end retaining flanges and having an opening, a spool in said housing having end disc flanges engaged with said end retaining flanges, said end disc flanges having rotational engagement with the inner surface of said tubular housing, a clothesline wound on said spool and passing through the mentioned opening, and releasable locking means interengaging the housing and spool.

3. A clothesline reel comprising a tubular housing formed with end retaining flanges and having an opening, a spool in said housing having end disc flanges engaged with said end retaining flanges, said end disc flanges having rotational engagement with the inner surface of said tubular housing, a clothesline wound on said spool and passing through the mentioned opening, and releasable locking means interengaging the housing and spool, said locking means comprising an eccentric disc carried by one of the spool disc flanges, and a pivot for the eccentric disc for movement thereof between operative and non-operative positions, said eccentric disc, in its operative position being engaged with the inner annular face of one of the mentioned end retaining flanges to wedge thereagainst.

4. A clothesline reel comprising a spool wound with a length of line, a housing for the spool having a bearing face for the outer periphery of the reel and formed with an opening for passing said line to and from the spool, said housing also being provided with an internally annular surface laterally of the spool, and releasable locking means carried by the spool and operatively engaged with said internally annular surface.

5. A clothesline reel comprising a spool wound with a length of line, a housing for the spool having a bearing face for the outer periphery of the reel and formed with an opening for passing said line to and from the spool, said housing also being provided with an internally annular surface laterally of the spool, and releasable locking means carried by the spool and operatively engaged with said internally annular surface, said locking means comprising an eccentric disc, a pivot for said disc on the spool, and means for releasably holding said disc in non-operative engagement with the mentioned annular surface.

6. A clothesline reel comprising a spool wound with a length of line, a housing for the spool having a bearing face for the outer periphery of the reel and formed with an opening for passing said line to and from the spool, said housing also being provided with an internally annular surface laterally of the spool, and releasable locking means carried by the spool and operatively engaged with said internally annular surface, said locking means comprising an eccentric disc, a pivot for said disc on the spool, and means for releasably holding said disc in non-operative engagement with the mentioned annular surface, the latter means comprising a resilient member formed with projections, and serrations on said disc engaged with said projections.

SIDNEY J. DUHAIME.
CORNELIUS V. BUTLER.

REFERENCES CITED

The following references are of record in the file of this patent:

UNITED STATES PATENTS

| Number | Name | Date |
| --- | --- | --- |
| 67,872 | Griffin | Aug. 20, 1867 |
| 1,096,963 | Sweeney | May 9, 1914 |
| 1,514,901 | Gilman | Nov. 11, 1924 |
| 1,567,483 | Bear | Dec. 29, 1925 |